(12) United States Patent
Ortiz

(10) Patent No.: US 8,752,224 B2
(45) Date of Patent: Jun. 17, 2014

(54) COMPOSITE PRY BAR AND STRIKING TOOL

(75) Inventor: Ronald J. Ortiz, Granada Hills, CA (US)

(73) Assignee: Nupla Corporation, Sun Valley, CA (US)

( * ) Notice: Subject to any disclaimer, the term of this patent is extended or adjusted under 35 U.S.C. 154(b) by 277 days.

(21) Appl. No.: 13/366,634

(22) Filed: Feb. 6, 2012

(65) Prior Publication Data

US 2013/0198967 A1    Aug. 8, 2013

(51) Int. Cl.
*B25F 1/00*    (2006.01)
*B25G 1/10*    (2006.01)
*B29C 70/84*    (2006.01)
*B29C 70/70*    (2006.01)
*B29C 70/52*    (2006.01)
*B29L 31/28*    (2006.01)

(52) U.S. Cl.
CPC ............... *B29C 70/70* (2013.01); *B29C 70/52* (2013.01); *B25G 1/10* (2013.01); *B29L 2031/283* (2013.01)
USPC ............................................. 7/166; 156/242

(58) Field of Classification Search
CPC ... B29L 2031/283; Y10S 16/902; B25G 1/00; B25G 3/34; B29C 70/52; B25C 9/00; B66F 15/00
USPC ................... 7/166, 167; 254/19, 21, 25, 120; 156/166, 169, 172, 180–182, 242; 81/489
See application file for complete search history.

(56) References Cited

U.S. PATENT DOCUMENTS

| | | | |
|---|---|---|---|
| 2,948,649 A | 8/1960 | Pancherz | |
| 3,556,888 A | 1/1971 | Goldsworthy | |
| 4,334,563 A * | 6/1982 | Epel et al. | 30/308.1 |
| 4,570,988 A | 2/1986 | Carmien | |
| 5,031,272 A | 7/1991 | Carmien | |
| 5,342,464 A * | 8/1994 | McIntire et al. | 156/172 |
| 5,421,931 A | 6/1995 | Carmien | |
| 5,632,837 A | 5/1997 | Carmien | |
| 5,896,788 A * | 4/1999 | Hreha et al. | 81/20 |
| 6,671,913 B2 * | 1/2004 | Wozniak | 7/138 |
| 8,091,865 B2 * | 1/2012 | Eric | 254/25 |
| 2006/0204739 A1 * | 9/2006 | Papke et al. | 428/297.4 |
| 2011/0162491 A1 * | 7/2011 | Belsey et al. | 81/463 |

* cited by examiner

*Primary Examiner* — David B Thomas
(74) *Attorney, Agent, or Firm* — Kelly & Kelley, LLP

(57) ABSTRACT

A composite pry bar and striking tool having an elongated solid body core surrounded by a molded polymer sleeve. The ends of the tool may include varying combinations of working tips including a pointed tool, a curved chisel, a tapping cap, and/or a molded polymer cap. The working tips are preferably adhesively bonded to the ends of the tool. The molded polymer sleeve includes first and second molded grips and may be segmented to allow for shorter or longer body lengths. The solid body core is formed by a pultrusion fiber resin curing process.

23 Claims, 6 Drawing Sheets

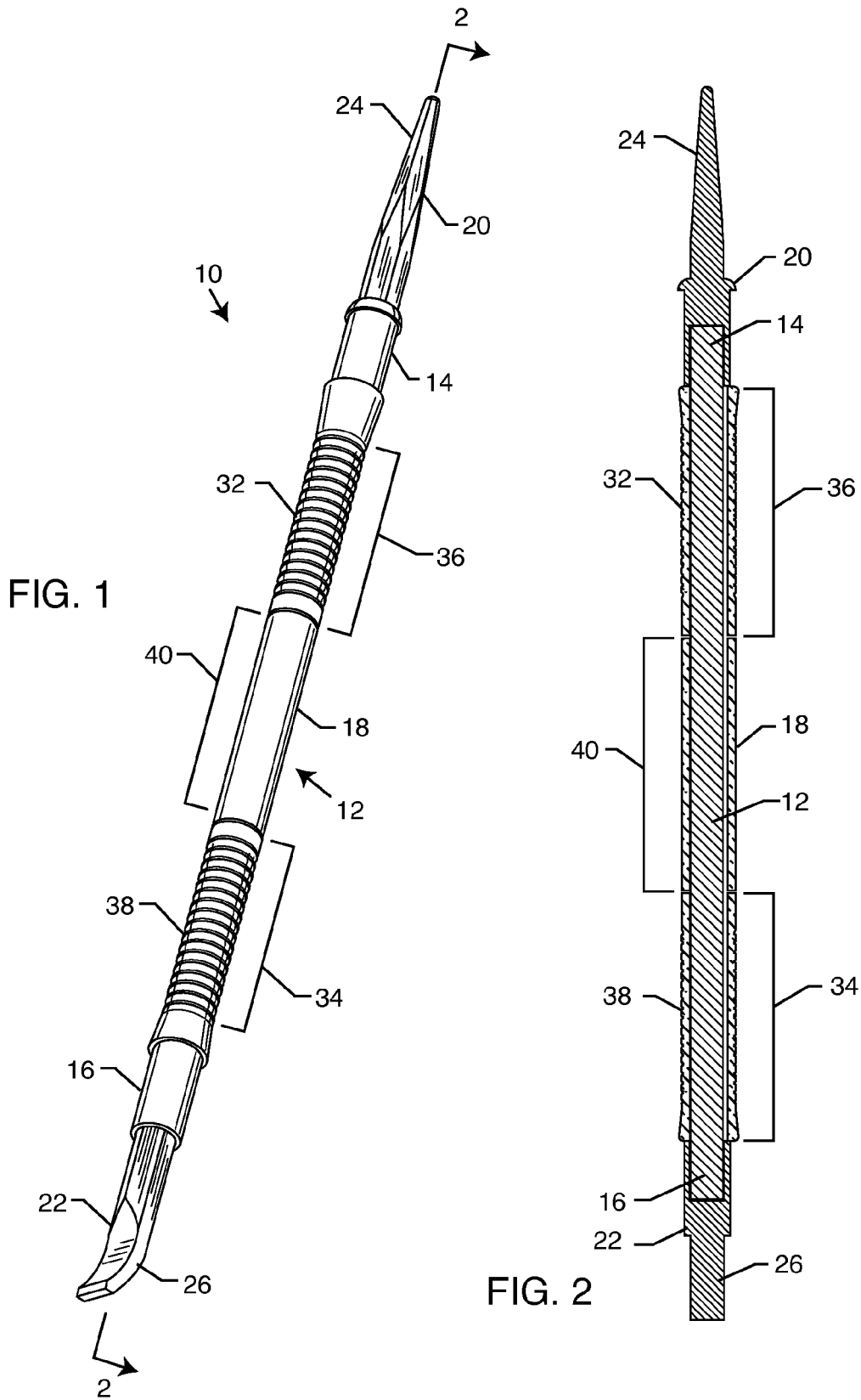

COMPOSITE PRY BAR AND STRIKING TOOL

BACKGROUND OF THE INVENTION

This invention relates generally to hand tools. More particularly, the present invention relates to an improved composite pry bar and striking tool having a construction which significantly increases the strength of the tool without a significant corresponding increase in weight.

In manufacturing a tool such as a pry bar or striking tool, a variety of competing design considerations are at stake. On the one hand, it is desirable to have a tool that is as light as possible, to provide for easy use by consumers. On the other hand, the tool must have the structural integrity to withstand the variety of stresses that will be placed on it. Solid steel pry bar and striking tools have been widely used in the past, but provide an often unacceptable increase in weight to achieve the desired structural integrity and impacting strength. The use of a wooden tool body would unacceptably compromise structural integrity to lessen the weight.

An alternative is the use of rods formed from resin coated fibers. The basic technique for running filaments through a resin bath and then through an elongated heated die tube to produce a cured composite rod of the same shape as the die tube has been known for some time. See, for example, U.S. Pat. Nos. 2,948,649 and 3,556,888. This method, however, produces a solid extruded product which may be unacceptably heavy and/or too rigid for many applications.

The weight problem can be alleviated by an existing process to extrude hollow tubes utilizing a die tube with the center filled, leaving an annular cross-section through which the resin coated fibers are pulled. This weight reduction is achieved, however, at the cost of significantly reduced bending or flexural strength in comparison with a solid rod, resulting in a tool body which would not be suitable for use in certain high stress applications such as pry bars and striking tools. Further, to increase interlaminar strength of the tube forming fibers, a substantial percentage of fibers running other than in a longitudinal direction have been thought to be required.

Accordingly, there has been an ongoing need for improved composite tool bodies to provide significantly increased tensile and flexural strength without a corresponding increase in the weight of the handle. The present invention fulfills these needs and provides other related advantages.

SUMMARY OF THE INVENTION

The composite pry bar and striking tool of the present invention has an elongated solid body with opposite first and second working ends. The solid body comprises a pultruded fiberglass shaft. A polymer sleeve is molded directly onto the elongated solid body. A first working tip is bonded to the first working end of the elongated solid body and a second working tip is bonded to the second working end. The first and second working tips are bonded respectively to the first and second working ends by a two-part epoxy adhesive.

In a preferred embodiment, the first working end protrudes from the molded polymer sleeve and is spiral ground. The first working tip preferably comprises a pointed tool or a curved chisel. In alternate embodiments, the second working end may either protrude from the molded polymer sleeve and be spiral ground or may be recessed within the molded polymer sleeve. In the case where the second working end protrudes, the second working tip also preferably comprises a pointed tool or a curved chisel. In the case where the second working end is recessed, the second working tip preferably comprises a tapping cap or a molded polymer cap integral with the molded polymer sleeve. The tapping cap comprises a hardened steel striking surface and the molded polymer sleeve has an oversized end proximate to the tapping cap to prevent overstrikes with a hammer or other striking tool.

The molded polymer sleeve preferably has a first molded grip proximate to the first working end and a second molded grip proximate to the second working end. The molded polymer sleeve is preferably segmented comprising a first portion proximate to the first working end and a second portion proximate to the second working end. The molded polymer sleeve may further comprise one or more middle portions disposed between the first and second portions such that the length of the molded polymer sleeve may be increased or decreased to accommodate elongated solid bodies of different lengths.

A process for manufacturing a composite pry bar and striking tool of the present invention begins with the step of pultruding resin-coated fibers to form an elongated solid fiberglass shaft having opposite first and second working ends. Further manufacturing includes the step of molding a polymer sleeve directly onto the fiberglass shaft. The tool is then completed by bonding a first working tip to the first working end and bonding a second working tip to the second working end.

The step of molding the polymer sleeve on the fiberglass shaft is performed such that the first working end protrudes from the molded polymer sleeve and further comprises the step of spiral grinding the first working end. In alternate embodiments, the molding step is further performed such that the second working end either protrudes from the molded polymer sleeve or is recessed within the molded polymer sleeve. In the case where the second working end protrudes, the process further comprises the step of spiral grinding the second working end.

The first bonding step preferably comprises bonding a pointed tool or a curved chisel to the first working end. The second binding step comprises bonding a pointed tool or a curved chisel to the second working end where the second working end protrudes from the molded polymer sleeve. Alternatively, the second bonding step comprises bonding a tapping cap or a molded polymer cap to the second working end in the case where the second working end is recessed within the molded polymer sleeve. Where a tapping cap is bonded to the second working end, the additional step of forming an oversized end on the molded polymer sleeve proximate to the tapping cap is performed.

The process further includes the steps of forming a first molded grip on the molded polymer sleeve proximate to the first working end and forming a second molded grip on the molded polymer sleeve proximate to the second working end. Preferably, the molded step comprises the step of molding a first portion of the molded polymer sleeve proximate to the first working end and molding a separate second portion of the molded polymer sleeve proximate to the second working end. The process may also include the step of forming at least one middle portion of the molded polymer sleeve between the first and second portions of the molded polymer sleeve.

The pultruding step preferably comprises the steps of feeding resin coated fibers into a pultrusion die tube, pulling the resin coated fibers through the pultrusion die tube, and curing the resin coated fibers to form the elongated solid fiberglass shaft. The pultruding step may also comprise the steps of feeding a core into the pultrusion die tube, surrounding the core with the resin coated fibers, pulling the core through the pultrusion die tube while keeping the core surrounded by the resin coated fibers, and curing the resin coated fibers around the core to form the elongated solid fiberglass shaft. The core preferably comprises alternating sections of lightweight filler core and reinforcing core. The core preferably has a wagon wheel-type cross-section.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 1 is a perspective view of a composite pry bar and striking tool of the present invention;

FIG. 2 is a cross-section of a tool of the present invention taken along line 2-2 of FIG. 1;

DETAILED DESCRIPTION OF THE PREFERRED EMBODIMENTS

Figure 3:
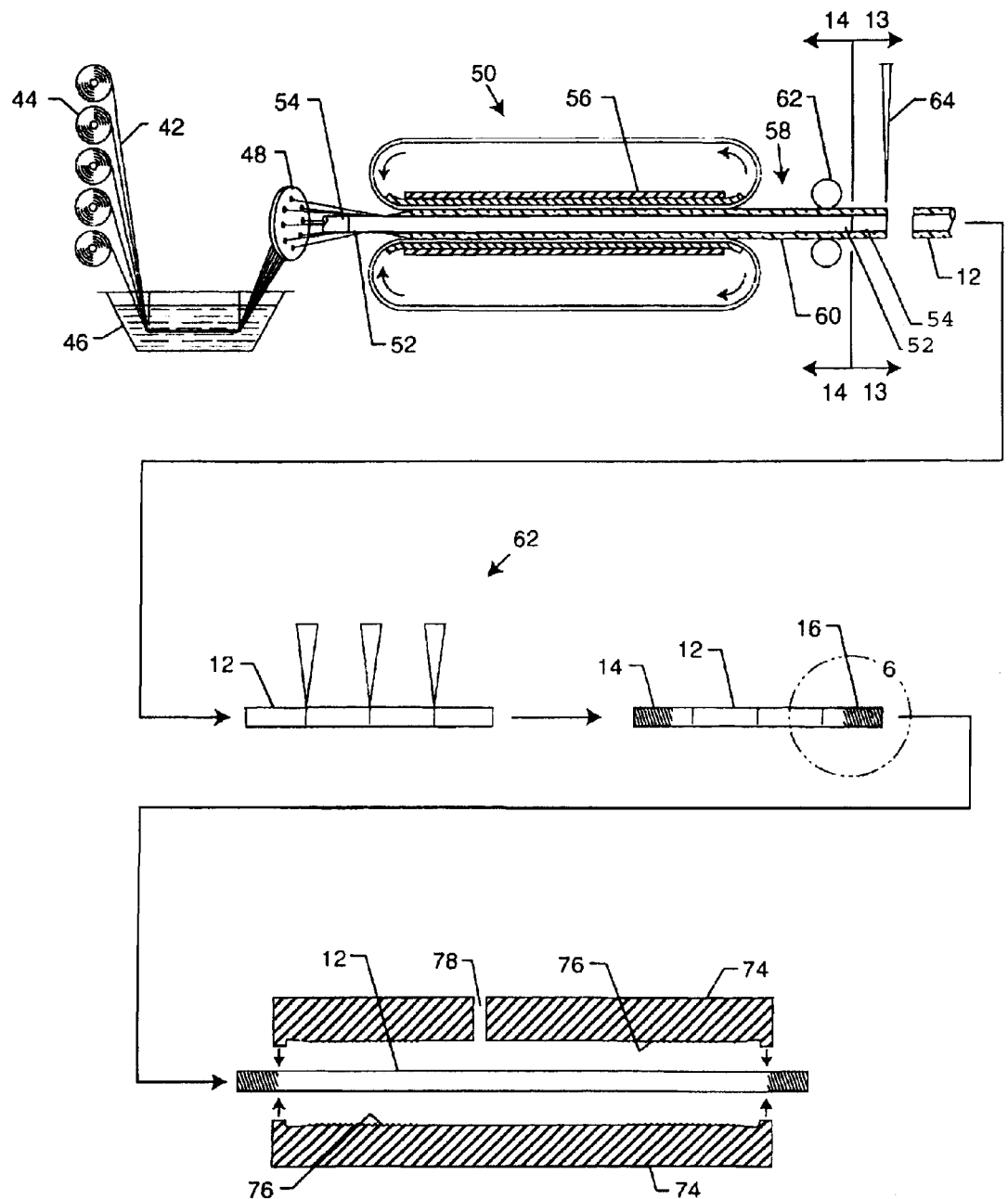
FIG. 3 is an illustration of the pultrusion process of the present invention.
Figure 4:
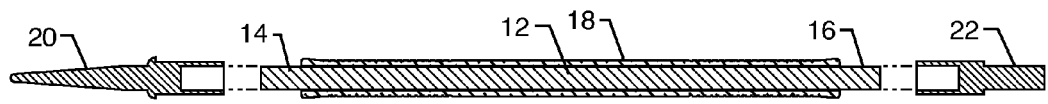
FIG. 4 is an exploded cross-sectional view of a tool of the present invention.
Figure 5:
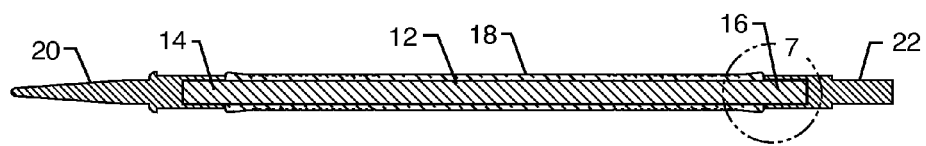
FIG. 5 is a cross-section of the tool of the present invention showing assembly of the parts.

As illustrated in FIGS. 1-7, the tool 10 generally comprises an elongated solid body 12 having a first working end 14 and a second working end 16, a molded polymer sleeve 18, a first working tip 20 bonded to the first working end 16, and a second working tip 22 bonded to the second working end 16. The first working tip 20 may comprise either a pointed tool 24 or a curved chisel 26. The second working tip 22 may also comprise either a pointed tool 24 or a curved chisel 26. Alternatively, the second working tip 22 may comprise a tapping cap 28 (FIGS. 8-10) or a molded polymer cap 30 (FIGS. 11 and 12) that is formed integrally with the molded polymer sleeve 18. The molded polymer sleeve 18 preferably includes a first molded grip 32 proximate to the first working end 14 and a second molded grip 34 proximate to the second working end 16. The molded polymer sleeve 18 may be formed as a single piece (FIGS. 4, 5, 8 and 11) or segmented as illustrated in FIGS. 1 and 2. When segmented, the molded polymer sleeve 18 comprises a first portion 36 proximate to the first working end 14 and a second portion 38 proximate to the second working end 16. The molded polymer sleeve 18 may also comprise one or more middle portions 40 to accommodate tools 10 of varying lengths. A tool 10 having a shorter body 12 may include fewer middle portions 40 or omit them entirely. A tool 10 having a longer body 12 may include more middle portions 40 so as to completely enclose the body 12 with the molded polymer sleeve 18.

Figure 13:
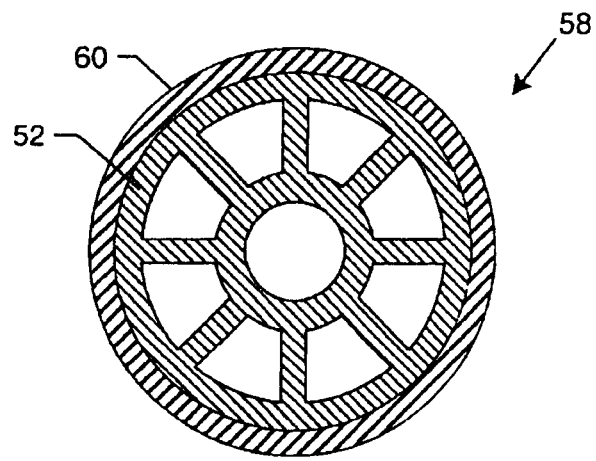
FIG. 13 is an enlarged sectional view taken along line 13-13 of FIG. 3, illustrating a lightweight filler core surrounded by a fiber-resin jacket.
Figure 14:
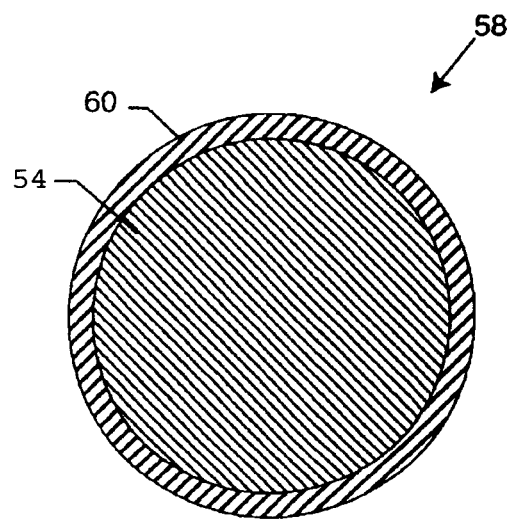
FIG. 14 is an enlarged sectional view taken along line 14-14 from FIG. 3, illustrating a reinforcing core surrounded by a fiber-resin jacket.

The elongated solid body 12 is manufactured in accordance with a pultrusion process described in detail in U.S. Pat. Nos. 4,570,988, 5,421,931 and 5,632,837, the entire disclosures of which are incorporated herein by this reference. The pultrusion process is illustrated schematically, in relevant part, in FIG. 3. More specifically, to manufacture the elongated solid body 12, a fiber material 42, i.e., fiberglass, is drawn off a series of spools or bales 44, then passed through a resin bath 46, and through a carding disc 48 into a pultrusion die tube 50 where the fibers 42 surround alternating sections of lightweight filler core 52 and reinforcing core 54 (see FIGS. 3, 13 and 14). Alternatively, the entire core may comprise reinforcing core 54. The resin coated fibers 42 are pulled through the die tube 50, and are heated and cured about the cores 52 and 54 by a conventional conduction heater or a microwave heating element 56, which surrounds the die tube 50. The cured rod body 58, consisting of the fiber-resin jacket 60 surrounding the core sections 52 and 54, is pulled out of the die tube 40 by tractor-type pullers 62 and cut into the desired length by a conventional cutting device 64.

The reinforcing core 54 is preferably located within the fiber-resin jacket 60 at those points where the greatest flexural stresses on the tool 10 are anticipated during normal use. Reinforcing core sections 54 may be used in the first and second working ends 14, 16 which are inserted into the first and second working tips 20, 22. By contrast, the lightweight filler core sections 52 preferably extend through the remainder of the elongated solid body 12 to minimize the overall weight of the tool 10.

Figure 6:
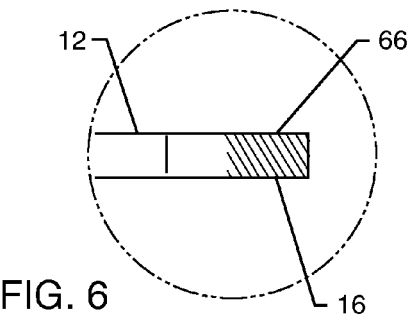
FIG. 6 is a close-up view of a working end of the elongated fiberglass shaft taken by circle 6 of FIG. 3.
Figure 7:
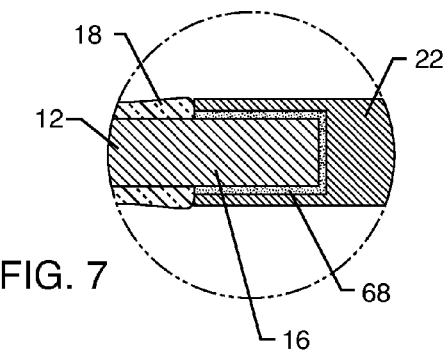
FIG. 7 is a close-up view of the bonding of a working tip to a working end taken at circle 7 of FIG. 5.

After the body 12 is cut from the pultruded cured rod body 58, the first and second working ends 14, 16 may be spiral ground 65 so as to increase the surface area available for bonding the first and second working tips 20, 22 thereto. As shown in FIGS. 6 and 7, this spiral grinding surface 66 produces screw-type threads or ridges on the working ends 14, 16 of the body 12. A working tip 20, 22 is then bonded to the working ends 14, 16 by an adhesive 68. This adhesive 68 is preferably a two-part epoxy combining an aliphatic polyaminoamide with an epoxy resin.

The body 12 is complete at this point and the molded polymer sleeve 18 may then be added. The molded polymer sleeve 18 is preferably applied by an injection molding process, wherein the body 12 is enclosed within a mold housing 74 that surrounds the body 12 on all sides. The cavity within the mold housing 74 preferably includes sets of ridges or grooves 76 to form the first and second molded grips 32, 34. The polymer material is injected into the mold housing 74 through an inlet port 78. The mold housing 74 may be configured to different lengths for different length bodies 12 or the internal cavity may be modified to form varying shapes as the oversized lip 72 (described below).

Figure 8:
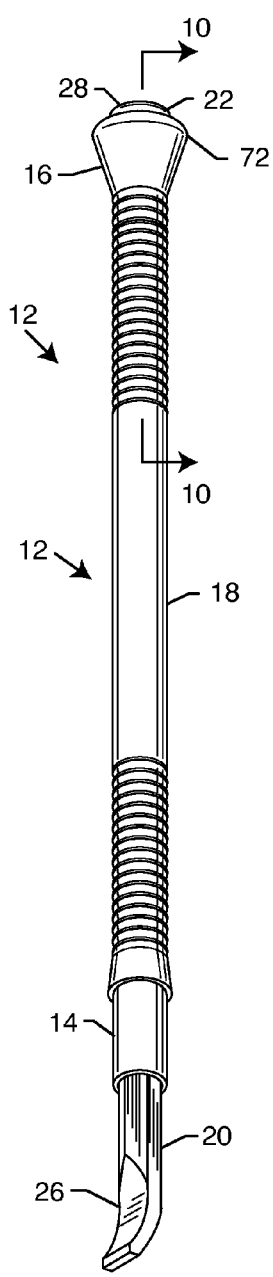
FIG. 8 is a perspective view of an alternate embodiment of the tool of the present invention.
Figure 9:
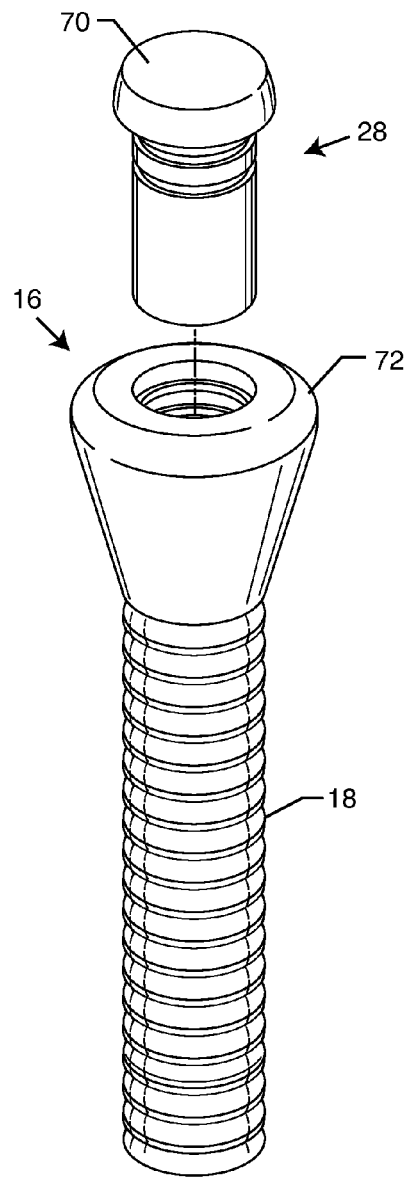
FIG. 9 is a close-up view of the second working end of the tool of the present invention illustrating insertion of a striking cap.
Figure 10:
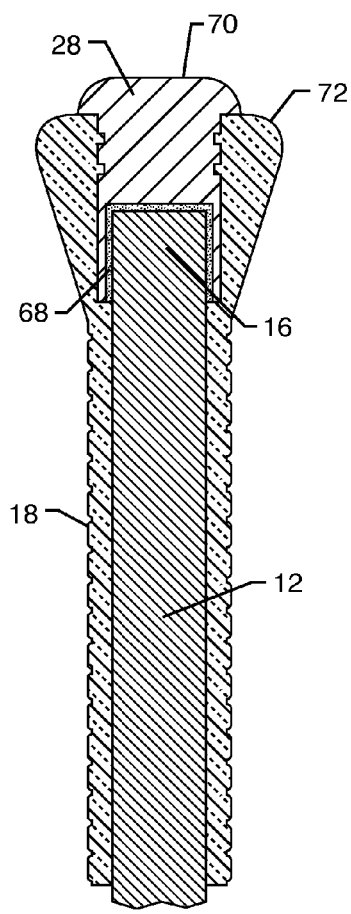
FIG. 10 is a partial cross-sectional view taken along line 10-10 of FIG. 8.

As discussed above, the second working tip 22 may comprise a tapping cap 28 (FIGS. 8-10). This tapping cap 28 includes a hardened steel striking surface 70. As with the other working tips 20, 22 the tapping cap 28 is bonded to the second working end 16 of the body 12, preferably using an adhesive 68. In addition, the end of the molded polymer sleeve 18 closest to the capping tap 28 has an oversized lip 72 surrounding the perimeter of the hardened steel striking surface 70. This oversized lip 72 helps prevent against overstrikes when impacting the hardened steel striking surface 70 with a hammer. The oversized lip 72 helps to catch and/or deflect any such overstrikes away from a user's hand on the second molded grip 34.

Figure 11:
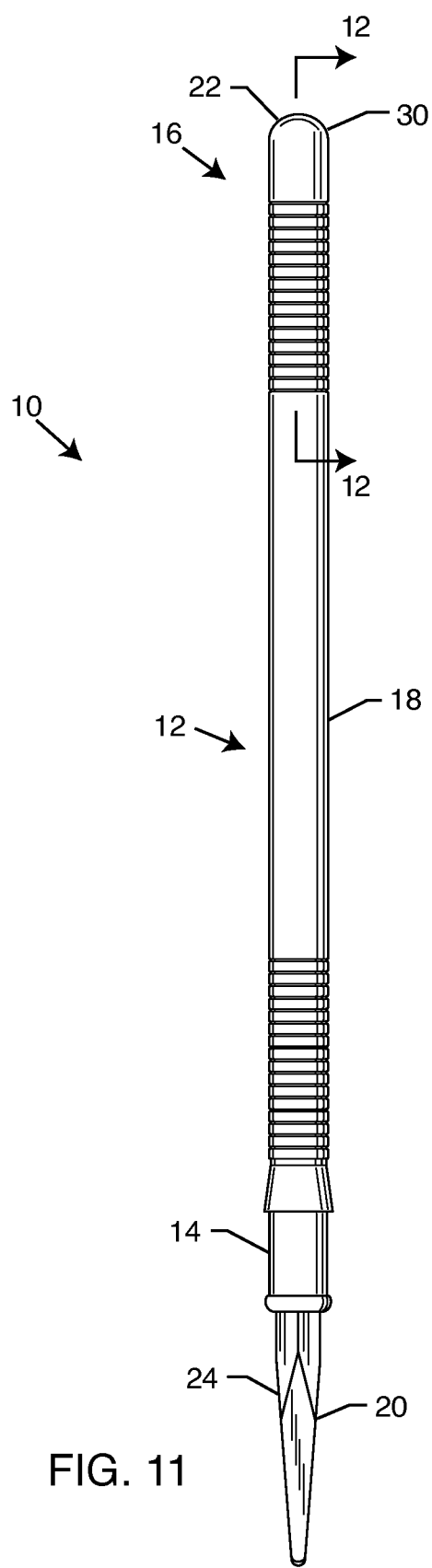
FIG. 11 is a front view of a tool of the present invention illustrating a molded polymer cap on the second working end.
Figure 12:
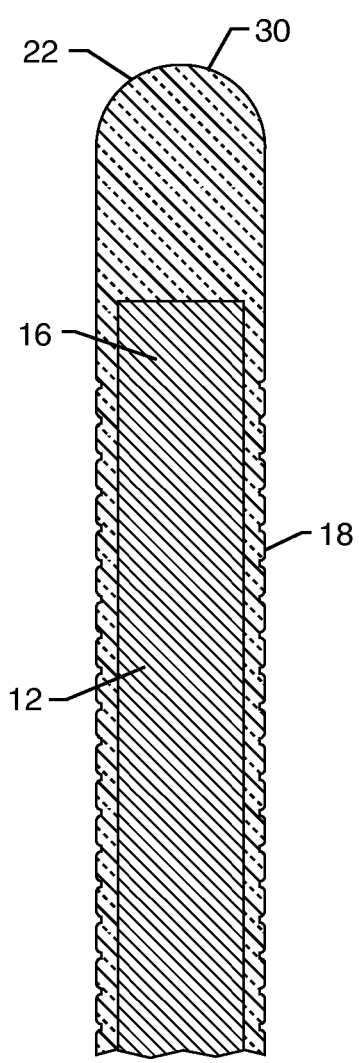
FIG. 12 is a partial cross-sectional view taken along line 12-12 of FIG. 11.

Also as discussed above, the second working tip 22 may comprise a molded polymer cap 30 that is integral with the molded polymer sleeve 18 (FIGS. 11-12). This molded polymer cap 30 is designed to enclose and surround the second working end 16 such that it is not exposed during use of the tool 10.

Although several embodiments have been described in detail for purpose of illustration, various modifications may be made without departing from the scope and spirit of the invention. Accordingly, the invention is not to be limited, except as by the appended claims.

What is claimed is:

1. A composite pry-bar and striking tool comprising:
   an elongated solid body having opposite first and second working ends, said solid body comprising a pultruded fiberglass shaft;
   a polymer sleeve molded directly on to the elongated solid body;
   a first working tip bonded to the first working end of the elongated solid body; and
   a second working tip bonded to the second working end of the elongated solid body;
   wherein the first working end protrudes from the molded polymer sleeve and is spiral ground.

2. The composite pry-bar and striking tool of claim 1, wherein the first working tip comprises a pointed tool or a curved chisel.

3. The composite pry-bar and striking tool of claim 2, wherein the second working end protrudes from the molded polymer sleeve and is spiral ground.

4. The composite pry-bar and striking tool of claim 3, wherein the second working tip comprises a pointed tool or a curved chisel.

5. The composite pry-bar and striking tool of claim 2, wherein the second working end is recessed within the molded polymer sleeve and wherein the second working tip comprises a tapping cap or a molded polymer cap.

6. The composite pry-bar and striking tool of claim 5, wherein the tapping cap comprises a hardened steel striking surface and the molded polymer sleeve has an over-sized end proximate to the tapping cap.

7. A composite pry-bar and striking tool, comprising:
   an elongated solid body having opposite first and second working ends, said solid body comprising a pultruded fiberglass shaft;
   a solmer sleeve molded directly on to the elongated said body;
   a first working tip bonded to the first working end of the elongated solid body; and
   a second working tip bonded to the second working end of the elongated solid body;
   wherein the molded polymer sleeve has a first molded grip proximate to the first working end and a second molded grip proximate to the second working end.

8. A composite pry-bar and striking tool, comprising:
   an elongated solid body having opposite first and second working ends, said solid body comprising a pultruded fiberglass shaft;
   a polymer sleeve molded directly on to the elongated solid body;
   a first working tip bonded to the first working end of the elongated solid body; and
   a second working tip bonded to the second working end of the elongated solid body;
   wherein the molded polymer sleeve is segmented comprising a first portion proximate to the first working end and a second portion proximate to the second working end.

9. The composite pry-bar and striking tool of claim 8, wherein the molded polymer sleeve further comprises at least one middle portion disposed between the first and second portions.

10. The composite pry-bar and striking tool of claim 8, wherein the first and second working tips are bonded respectively to the first and second working ends by a two-part epoxy adhesive.

11. A process for manufacturing a composite pry-bar and striking tool comprising the steps of:
    pultruding resin-coated fibers to form an elongated solid fiberglass shaft having opposite first and second working ends;
    molding a polymer sleeve directly on to the fiberglass shaft;
    bonding a first working tip to the first working end; and
    bonding a second working tip to the second working end;
    wherein the molding step is performed such that the first working end protrudes from the molded polymer sleeve and further comprising the step of spiral grinding the first working end.

12. The process of claim 11, wherein the first bonding step comprises bonding a pointed to11 or a curved chisel to the first working end.

13. The process of claim 11, wherein the molding step is performed such that the second working end protrudes from the molded polymer sleeve and further comprising the step of spiral grinding the second working end.

14. The process of claim 11, wherein the second bonding step comprises bonding a pointed tool or a curved chisel to the second working end.

15. The process of claim 11, wherein the molding step is performed such that the second working end is recessed in the molded polymer sleeve, and wherein the second bonding step comprises bonding a tapping cap or a molded polymer cap to the second working end.

16. The process of claim 15, further comprising the step of forming an over-sized end on the molded polymer sleeve proximate to the tapping cap.

17. A process for manufacturing a composite pry-bar and striking tool, comprising the steps of:
    pultruding resin-coated fibers to form an elongated solid fiberglass shaft having opposite first and second work ends;
    molding a polymer sleeve directly on to the fiberglass shaft;
    bonding a first working tip to the first working end; and
    bonding a second working tip to the second working end;
    further comprising the steps of forming a first molded grip on the molded polymer sleeve proximate to the first working end and forming a second molded grip on the molded polymer sleeve proximate to the second working end.

18. A process for manufacturing a composite pry-bar and striking tool comprising the steps of:
    pultruding resin-coated fibers to form an elongated solid fiberglass shaft having opposite first and second working ends;
    molding a polymer sleeve directly on to the fiberglass shaft;
    bonding a first working tip to the first working end; and
    bonding a second working tip to the second working end;

wherein the molding step comprises the steps of molding a first portion of the molded polymer sleeve proximate to the first working end and molding a separate second portion of the molded polymer sleeve proximate to the second working end.

19. The method of claim 18, further comprising the step of forming at least one middle portion of the molded polymer sleeve disposed between the first and second portions of the molded polymer sleeve.

20. The method of claim 1, wherein the pultruding step comprises the steps of:
   feeding resin-coated fibers into a pultrusion die tube;
   pulling the resin-coated fibers through the pultrusion die tube; and
   curing the resin coated fibers to form the elongated solid fiberglass shaft.

21. The method of claim 20, further comprising the steps of:
   feeding a core into the pultrusion die tube;
   surrounding the core with the resin-coated fibers;
   pulling the core through the pultrusion die tube while keeping the core surrounded by the resin coated fibers; and
   curing the resin coated fibers around the core to form the elongated solid fiberglass shaft.

22. The method of claim 21, wherein the core comprises alternating sections of lightweight filler core and reinforcing core.

23. The method of claim 21, wherein the core has a wagon wheel-type cross-section.

* * * * *